July 17, 1951 W. R. KOCK 2,561,058
FREQUENCY MODULATION TRANSFORMER LOADING CIRCUIT
Filed Feb. 24, 1947
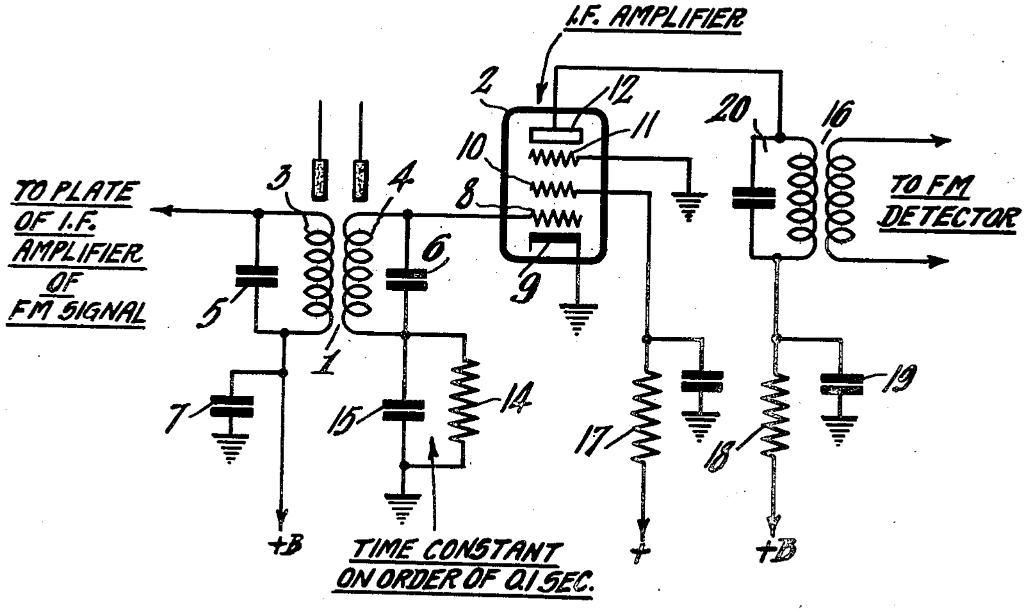
INVENTOR.
Winfield R. Koch
BY H. S. Grover
ATTORNEY Patented July 17, 1951

2,561,058

UNITED STATES PATENT OFFICE 2,561,058

FREQUENCY MODULATION TRANSFORMER LOADING CIRCUIT

Winfield R. Koch, Moorestown, N. J., assignor to Radio Corporation of America, a corporation of Delaware Application February 24, 1947, Serial No. 730,606

3 Claims. (Cl. 179—171)

My present invention relates generally to a circuit which will absorb sudden variations in amplitude of an angle modulated carrier wave, and more particularly to frequency modulation (FM) circuits including a transformer for FM signal waves, which is provided with a novel arrangement for variably loading the transformer in response to the aforesaid amplitude variations.

When an FM carrier wave is passed through an FM receiver it is highly desirable that the modulation output voltage of the demodulator stage be free of variations caused by amplitude changes in the received FM carrier wave. Such amplitude changes or variations can be caused in various ways, as by an interfering wave, by multi-path signal transmission, by changes in the transmission medium itself, or by a phenomenon known as "airplane flutter." It is not believed necessary to a proper understanding of the present invention to go into detail concerning these different phenomena. It is believed sufficient to point out that they manifest themselves at the signal collector device of the FM receiver as undesirable, and sometimes very large, amplitude variations in the received carrier wave. The most troublesome of these variations are also sudden and fast.

FM detector circuits have heretofore been provided which are inherently non-responsive to amplitude variations in the FM signal which is applied to them. However, it has been found that operating situations can arise in which an FM receiver, employing a detector of a type normally insensitive to amplitude variations, produces undesirable output voltages which are representative of amplitude variation in the FM signal. For example, in the aforesaid phenomena termed multi-path signal transmission and airplane flutter it has sometimes been found difficult to eliminate resultant distortion at the detector output.

Accordingly, M. S. Corrington has disclosed and claimed in his application, Serial No. 731,193 filed February 27, 1947 a novel method of, and circuit for, absorbing sudden variations in amplitude of an FM carrier wave prior to application of the wave to the FM detector. In his application, Corrington has disclosed the use of a variable loading circuit across one of the signal transformers of an FM receiver, preferably that feeding the FM signal to the amplifier or driver tube prior to the demodulator. The circuit arrangements disclosed in that application have resulted in very substantial rejection of amplitude modulation of a kind difficult for FM detectors of a type usually insensitive to amplitude variations to handle.

It may be stated that it is an important object of my present invention to provide variable transformer loading action of the nature referred to in the Corrington application without the use of any special devices or tubes other than those normally required for amplification prior to the FM demodulator stage.

It is a more specific object of my invention to include in the signal current return path of an angle-modulated carrier frequency amplifier, preferably an intermediate frequency (I. F.) amplifier of FM signals, a resistance-capacitance network having a time constant which is relatively long thereby greatly to reduce any rapid amplitude variations in the FM signal applied to the signal grid of the I. F. amplifier.

Still other objects of my invention are to improve generally the operation of an FM receiver, and more specifically to provide a means for removing amplitude modulation from an FM signal wave in a very economical manner.

Other features and objects of my invention will best be understood by reference to the following description, taken in connection with the drawing, in which I have indicated diagrammatically a circuit organization whereby my invention may be carried into effect.

Referring now to the drawing there is shown the circuit connections of only so much of an FM receiver as is necessary to a proper understanding of the present invention. Those skilled in the art of FM radio communication are fully aware of the apparatus required in the present superheterodyne type of receiver which is widely employed to receive FM signals in the present FM broadcast band of 88–108 megacycles (mc.). Of course, my invention is not restricted to any particular band of FM communication, nor to frequency modulation of the carrier waves. I have employed the generic term "angle modulated" herein to cover both frequency and phase modulation, as well as hybrid modulations possessing characteristics common to both.

In the drawing I have only shown the circuits employed between the input terminals of the FM demodulator or detector and the output terminals of the I. F. amplifier which feeds the amplifier or driver preceding the FM detector. It will be understood that the signal transmission networks employed between the signal collector device, which may be a dipole, and the FM detector have passband widths in excess of 150 kilocycles (kc.) so as to pass efficiently the full frequency swing of ±75 kc. of each FM signal. While the I. F. value is preferably 10.7 mc., it may be any other suitable value. The reduction of the received FM signal to a center frequency of the I. F. value may be accomplished in any suitable and known manner.

For example, the FM signals may be collected by any desired form of signal collector device, and the collected signals may be selectively amplified at one or more stages of high frequency amplification at the selected center frequency of the desired FM signals. The selectively amplified FM signals are usually then applied to a mixer stage for conversion to the I. F. signal energy. The I. F. signal energy may be selectively amplified in one or more I. F. amplifier stages which may each have the construction shown in the drawing.

The numeral 1 designates the I. F. transformer which couples the plate circuit of a preceding I. F. amplifier to the signal input electrodes of the I. F. amplifier tube 2. Transformer 1 is provided with primary winding 3 and secondary winding 4 which are preferably of the adjustable magnetic core type. Primary winding 3 is shunted by its tuning condenser 5, while secondary winding 4 is shunted by its tuning condenser 6. Each of circuits 3, 5 and 4, 6 is tuned to the operating I. F. value of 10.7 mc. The coupling between the circuits is chosen so as to pass with high efficiency the maximum frequency swings of the I. F. carrier. A passband of 200 kc. is usually employed. Such a band width would, of course, be chosen for the prior and succeeding tube coupling networks. The high potential side of primary circuit 3, 5 is connected to the plate of the prior I. F. amplifier tube (not shown). The prior tube may be the mixer or converter tube, if desired.

The low potential side of primary circuit 3, 5 is connected to a suitable terminal +B of the direct current supply source (not shown), while condenser 7 returns the low side of circuit 3, 5 to ground for I. F. currents. The tube 2 is shown as a pentode, and may be a tube having operating characteristics similar to those of the present commercial 6AU6 type. Any other suitable type of tube may be employed for tube 2 and prior tubes. The stage including tube 2 functions as a driver stage with normal and full gain at I. F. It comprises a signal or control electrode 8, grounded cathode 9, screen grid 10, suppressor grid 11 and plate or output electrode 12.

The signal grid 8 is connected to the high potential side of secondary circuit 4, 6, while the low potential end of winding 4 is connected to ground through resistor 14. The latter is shunted by a condenser or capacitor 15. The value of the resistor 14 is chosen and the network 14, 15 is given a predetermined time constant value so as to secure the transformer loading action referred to above. Condenser 15 may be an electrolytic condenser and have a value of 5 microfarads while resistor 14 may suitably have a magnitude on the order of 22,000 ohms which about equals the effective impedance presented by the tuned secondary circuit. It is to be understood that these values are illustrative, and not restrictive. The resistor 14 should be low enough to cause appreciable loading of the tuned circuit 4, 6. The effective damping of the secondary, by this resistor and the tube grid current is approximately the same as would be caused by a resistor only, of half the resistance value, directly across the secondary coil. It is also important that network 14, 15 have a time constant on the order of 0.1 second. With such a relatively long time constant the signal voltage appearing across the input circuit of tube 2 follows only slow changes of the applied carrier amplitude.

The plate 12 of I. F. amplifier tube 2 is connected to the +B supply point through the primary winding of transformer 16 which feeds the FM detector or demodulator. Screen grid 10 and anode 12 may be connected to the +B point for positive biasing through respective suitably bypassed voltage-reducing resistors 17 and 18. The condenser 19, having a value of 5 mf., returns the upper end of resistor 18 to ground. The amplified I. F. signals developed at output circuit 20 are applied to any suitable FM detector. The construction of the detector is no part of my invention, and is, therefore, not shown.

It is believed sufficient for the purposes of this application to point out that the FM detector may be constructed in accordance with the teaching of S. W. Seeley in U. S. Patent No. 2,121,103, granted June 21, 1938, or in accordance with my U. S. Patent No. 2,410,983 granted November 12, 1946, or my U. S. Patent No. 2,413,977 granted January 7, 1947. The FM detector may more advantageously be the type shown by S. W. Seeley in application Serial No. 614,956 filed September 7, 1945, now Patent No. 2,497,841, which detector is known as a ratio detector and is inherently, and it is believed under most conditions which will be met with in FM reception, non-responsive to amplitude changes in FM signals.

The connections between grid 8 and cathode 9 function to load the secondary circuit 4, 6, and tend to vary the "Q" of the secondary circuit 4, 6. Hence, the degree of coupling between windings 3 and 4 is varied. The variation of the "Q" of the secondary circuit and the degree of coupling between the primary and secondary circuits of transformer 1 is such that as the amplitude of the carrier wave changes amplitude modulation of the FM wave is considerably reduced. Whatever the cause of the relatively rapid amplitude variations existing on the FM signal wave applied to grid 8, the effect of inserting the network 14, 15 in the grid return of tube 2 is to provide a considerable reduction of such amplitude modulation effects.

A qualitative explanation of how this AM reduction occurs is presented herewith as my personal viewpoint. First, consider the case where the FM carrier wave at grid 8 increases rapidly in amplitude. The grid 8 will start to acquire a high positive charge, and, therefore, there will be a larger amount of current flow to grid 8 momentarily increasing the loading on the secondary circuit 4, 6. As a result, the "Q" of the secondary circuit and the gain of the stage drop sharply during this time, and tend to maintain the FM carrier wave at its original level. Because of the long time constant in the grid return circuit, an increased grid current can flow for a considerable period of time before the voltage across the condenser will be appreciably changed. If the carrier wave starts to decrease rapidly in amplitude, the capacitor 15 maintains the bias on grid 8. The reduction in carrier wave amplitude then causes less grid current to flow thereby unloading the secondary circuits and raising the "Q" thereof. The increased gain of the amplifier tends to maintain the carrier wave at its original level as before.

The time constant of the loading circuit is chosen such that the circuit responds only to slow changes of the carrier amplitude. If the average carrier level changes, the electrolytic capacitor 15 across resistor 14 charges up to a new equilibrium condition and the circuit maintains its amplitude modulation rejecting characteristics. When the circuit is operating properly, the FM carrier wave tends to maintain its unmodulated level. That is, the hollows are filled and the peaks are depressed because of the variable loading action on the transformer secondary circuit 4, 6. My circuit smooths out the carrier envelope efficiently over a wide range of average signal levels. This action is in marked contrast to the function of a conventional amplitude limiter tube which smooths out the carrier envelope only when peaks are greater than a threshold value and whose effectiveness varies considerably with average signal level. The "Q" of the primary and secondary windings of the unloaded transformer 1 should be made as high as possible ($Q=200$) for best performance of the loading action. The amplitude modulation on the FM carrier wave is reduced more satisfactorily when transformer 1 is undercoupled than when it is overcoupled.

While I have indicated and described a system for carrying my invention into effect, it will be apparent to one skilled in the art that my invention is by no means limited to the particular organization shown and described, but that many modifications may be made without departing from the scope of my invention.

What I claim is:

1. In an amplifier system for frequency modulation signals, an amplifier tube having at least a signal grid, cathode and plate, a source of frequency modulated carrier wave of a predetermined frequency modulated by signals in a predetermined frequency range, a transformer having loosely coupled primary and secondary circuits each tuned to said carrier wave frequency, said source being coupled to said primary circuit, said signal grid being connected for direct currents to the high potential side of the secondary circuit, a resistor, and a capacitor shunting said resistor and connecting the low potential side of the secondary circuit to said cathode, said resistor having a resistance low enough to cause appreciable loading of the tuned secondary circuit, said resistor and said capacitor having a time constant which is long compared to a cycle of the lowest modulation signal frequency within said frequency range, said resistor and capacitor having an impedance approximately equal to the impedance which said circuits present to said carrier wave whereby said resistor and capacitor provide a variable loading circuit to prevent amplitude variations in the said carrier wave from affecting said amplifier.

2. In an amplifier for frequency modulated carrier waves, an electron amplifier tube having at least a grid, cathode and plate, a parallel resonant wave input circuit, a series direct current circuit including said resonant input circuit, the control grid and cathode terminals of said electron amplifier tube and a resistor, a condenser shunting said resistor, said resistor having an impedance approximately equal to the effective impedance presented by said resonant circuit to said wave, and said condenser having a value such as to give, with said resistor, a time constant on the order of 0.1 second.

3. In an amplifier for carrier waves frequency modulated by an audio frequency signal, an electron amplifier tube having at least a grid, cathode and plate, a parallel resonant wave input circuit, a series direct current circuit including said resonant input circuit, the control grid and cathode terminals of said electron amplifier tube and a resistor, a condenser shunting said resistor, said resistor having an impedance approximately equal to the effective impedance presented by said resonant circuit to said wave, and said condenser having a value such as to give, with said resistor, a time constant on the order of 0.1 second.

WINFIELD R. KOCH.

REFERENCES CITED

The following references are of record in the file of this patent:

UNITED STATES PATENTS

| Number | Name | Date |
|---|---|---|
| 1,931,866 | Heising | Oct. 24, 1933 |
| 2,344,699 | Hunt | Mar. 21, 1944 |
| 2,422,083 | Crosby | June 10, 1947 |